US00RE37388B1

(19) United States
(12) Reissued Patent
Kasner et al.

(10) Patent Number: US RE37,388 E
(45) Date of Reissued Patent: Sep. 25, 2001

(54) RIDGE CAP TYPE ROOF VENTILATOR

(75) Inventors: Gary P. Kasner, Eden Prairie; Mark S. Stoll, Excelsior; Richard J. Morris, Prior Lake, all of MN (US)

(73) Assignee: Liberty Diversified Industries, Inc., New Hope, MN (US)

(21) Appl. No.: 08/209,559

(22) Filed: Mar. 10, 1994

Related U.S. Patent Documents

Reissue of:
(64) Patent No.: 5,094,041
Issued: Mar. 10, 1992
Appl. No.: 07/479,376
Filed: Feb. 13, 1990

(51) Int. Cl.[7] ..... F24F 7/02; E04D 1/30
(52) U.S. Cl. ..... 52/57; 52/199; 454/365
(58) Field of Search ..... 52/57, 198, 199; 454/365; D23/373, 393

(56) References Cited

U.S. PATENT DOCUMENTS

| | | | | |
|---|---|---|---|---|
| 2,868,104 | * | 1/1959 | Honholt et al. | 454/365 |
| 3,311,047 | * | 3/1967 | Smith et al. | 454/365 |
| 3,481,263 | * | 12/1969 | Belden | 454/365 |
| 3,625,134 | * | 12/1971 | Smith | 454/365 |
| 3,949,657 | * | 4/1976 | Sells | 52/199 |
| 4,545,291 | * | 10/1985 | Kutsch et al. | 454/365 |
| 4,676,147 | * | 6/1987 | Mankowski | 454/365 |
| 4,803,813 | * | 2/1989 | Fiterman | 52/199 |
| 4,817,506 | * | 4/1989 | Cashman | 52/199 |
| 4,843,953 | * | 7/1989 | Sells | 454/365 |
| 4,876,950 | * | 10/1989 | Rudeen | 454/365 |
| 5,009,149 | * | 4/1991 | MacLeod et al. | 454/365 |
| 5,174,076 | * | 12/1992 | Schiedegger et al. | 52/199 |

OTHER PUBLICATIONS

W.I.P.O. Printed Application: WO84/02970 Aug. 2, 1984.*

* cited by examiner

*Primary Examiner*—Michael Safavi
(74) *Attorney, Agent, or Firm*—Patterson, Thuente, Skaar & Christensen, P.A.

(57) ABSTRACT

A ridge peak roof ventilator comprising a pair of vent parts disposed on opposing sides of an opening in a roof peak, and a top panel disposed above and connecting each of the vent parts. The vent parts may be of unitary construction, folded from interconnected panels, or assembled from individual layers of sheet material, and each forms a multiplicity of air passages through which air flows from the interior to the exterior of the roof ventilator. The top panel is constructed from double-faced corrugated plastic having a pair of planar plies and a convoluted intermediate ply. The underside of the top panel is routed along the centerline to form a concave recessed area, thereby cutting away a section of one planar ply and part of the intermediate ply to form oval-shaped openings. Each opening has side walls traversing concave arcuate paths between a maximum height adjacent the side edges of the [recesesd] *recessed* area and a minimum height along the centerline. The top panel will responsively fold along the centerline corresponding to the minimum heights of each of the side walls. Each vent part defines pockets serving as precipitation barriers, the pockets being formed by cutting an array of apertures into separate panels and folding or attaching those panels in parallel abutting contact with the apertures aligned. The top panel may also define one or more lines of apertures extending completely there-through. The roof ventilator may be shipped flat or folded into a compact bundle.

20 Claims, 5 Drawing Sheets

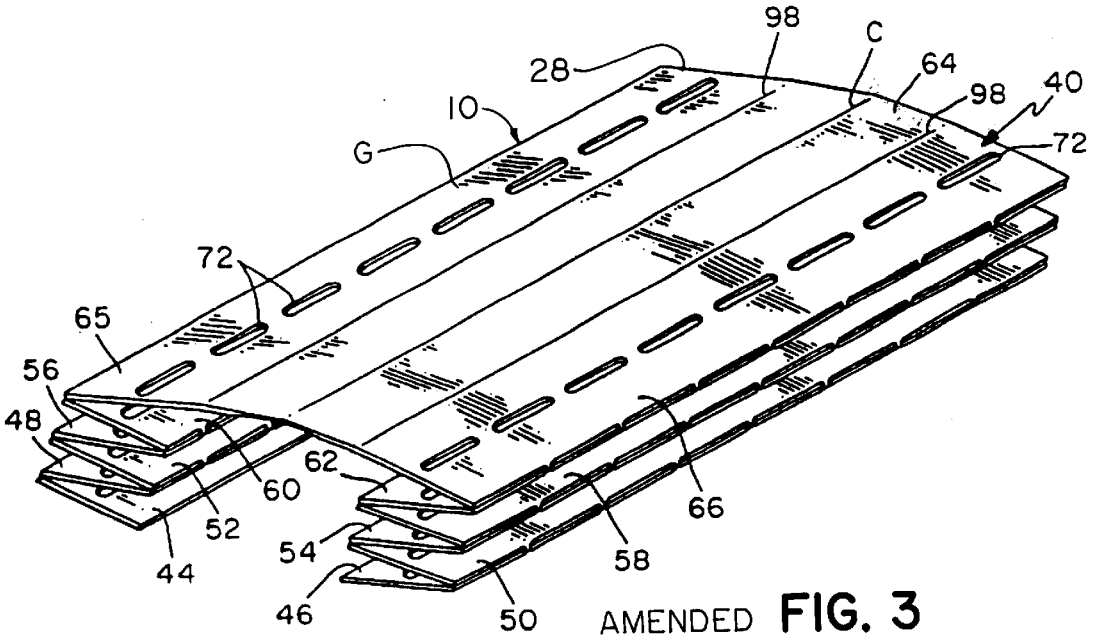
AMENDED FIG. 3
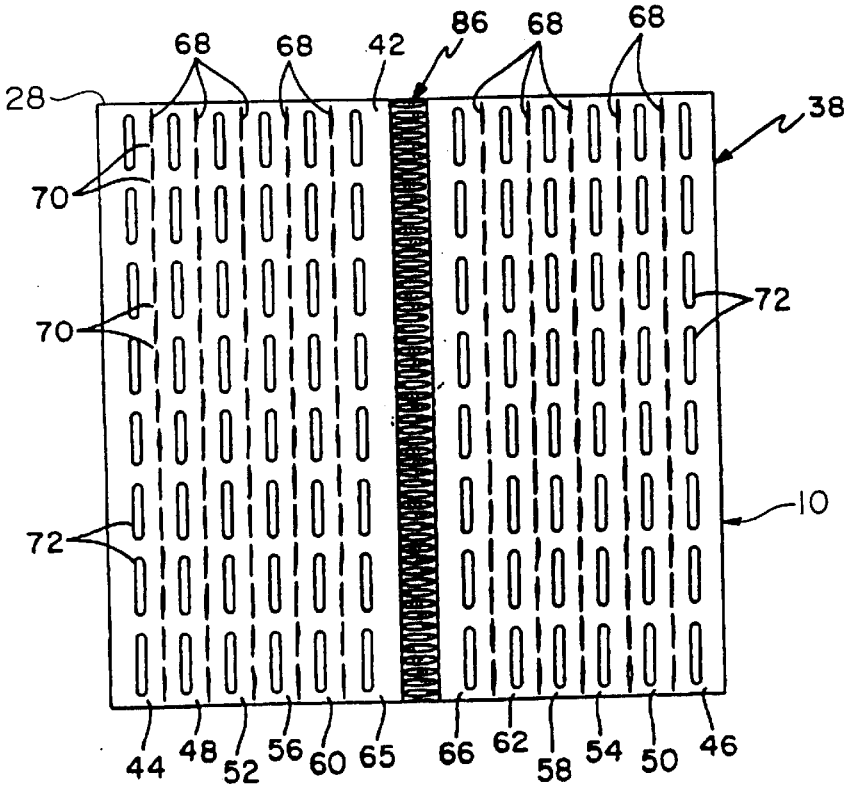
AMENDED FIG. 4

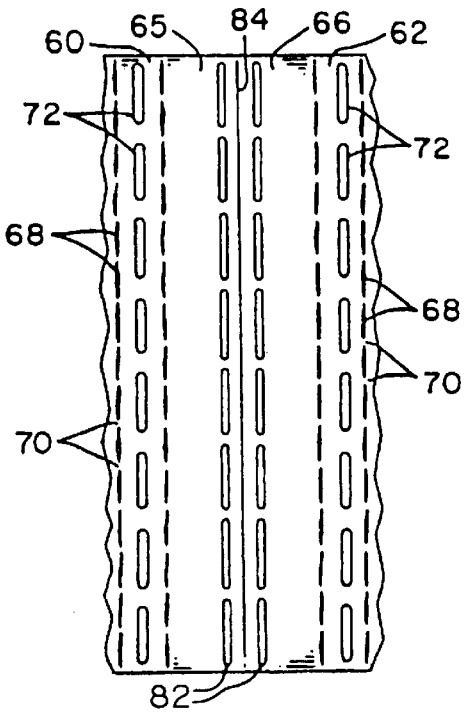
AMENDED FIG. 5
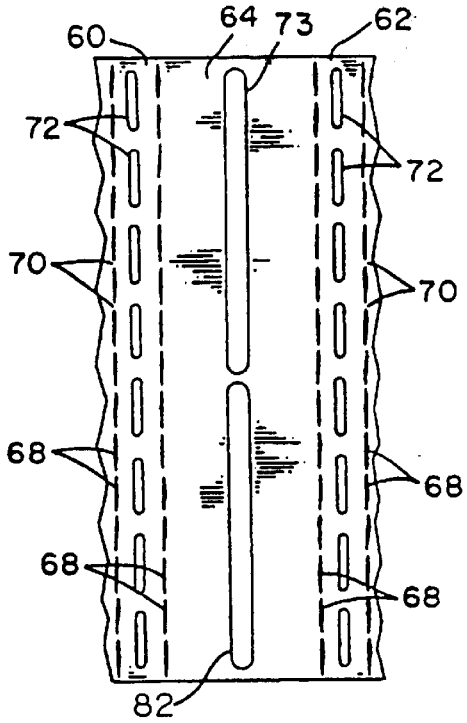
AMENDED FIG. 6
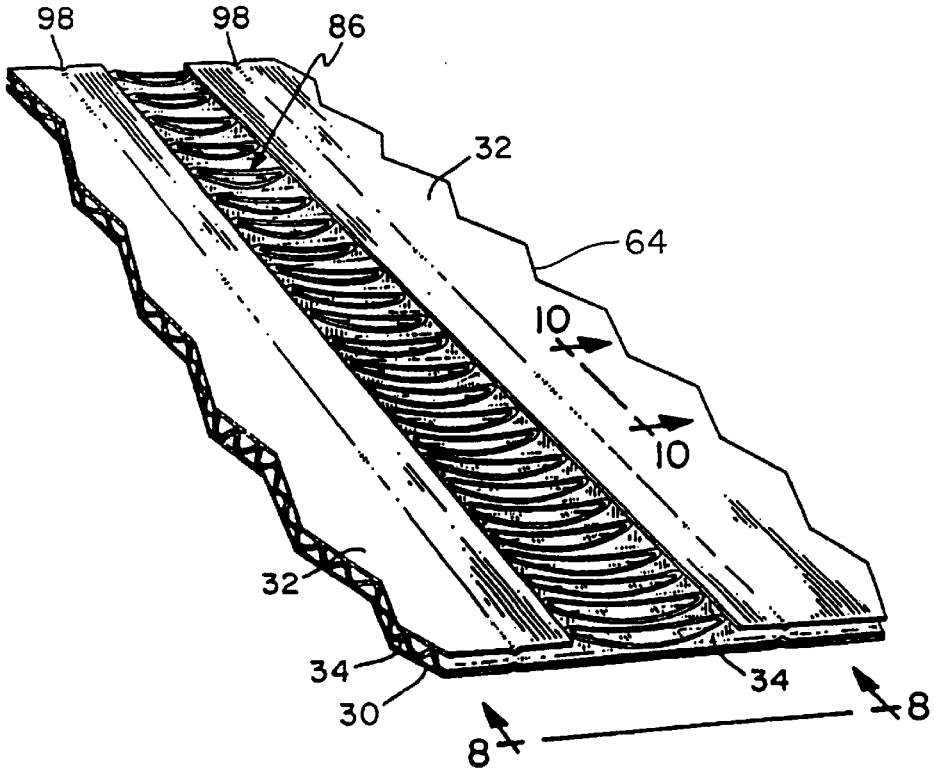
AMENDED FIG. 7

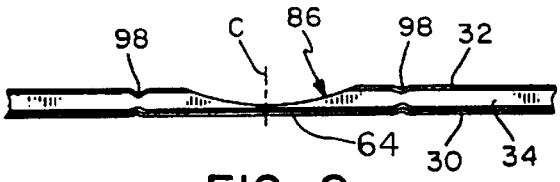
AMENDED FIG. 8
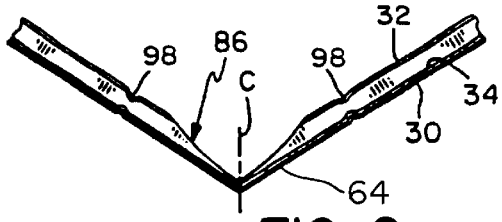
AMENDED FIG. 9
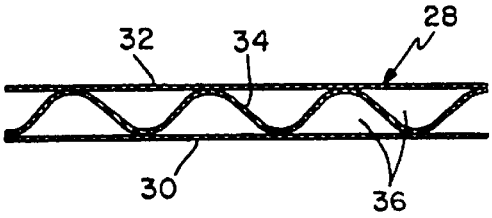
FIG. 10
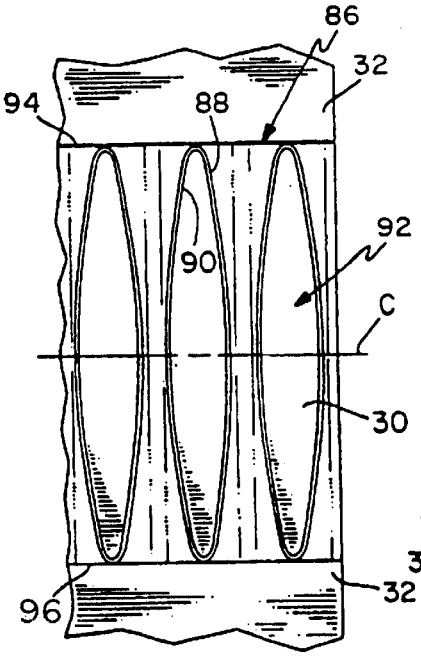
AMENDED FIG. 11
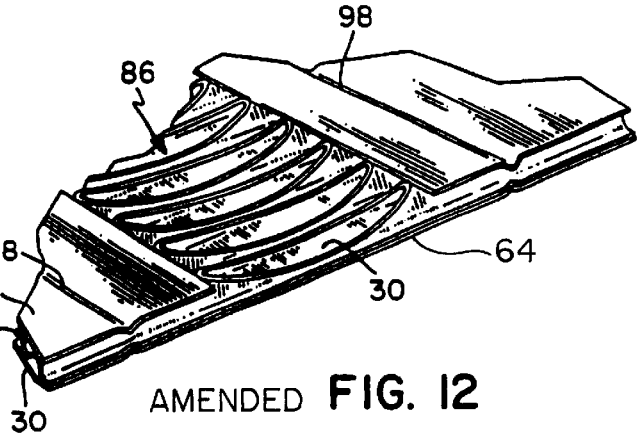
AMENDED FIG. 12
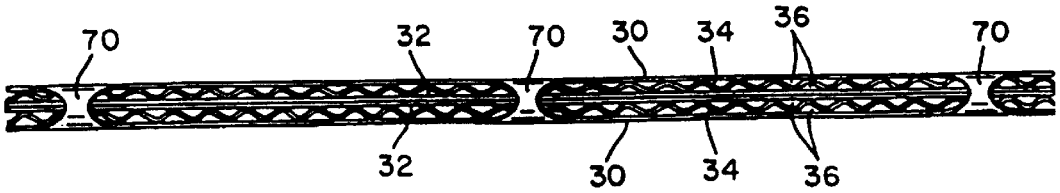
FIG. 13

RIDGE CAP TYPE ROOF VENTILATOR

Matter enclosed in heavy brackets [ ] appears in the original patent but forms no part of this reissue specification; matter printed in italics indicates the additions made by reissue.

BACKGROUND OF THE INVENTION

*This* invention relates generally to roof ventilators, and particularly to improved methods for manufacturing a foldable corrugated plastic ridge cap type roof ventilator The preferred embodiment of a foldable corrugated plastic ridge cap roof ventilator is disclosed in U.S. Pat. No. 4,803,813 to Fiterman, the content of that patent disclosure and its related documents being incorporated herein by reference. The details and description of the fabrication, assembly, and use of the Fiterman '813 roof ventilator should be assumed to apply in all pertinent respects to the roof ventilator disclosed herein, with the exception of the particular variations and improvements set forth and described with particularity.

Several patents on roof ventilators are also of note, particularly U.S. Pat. No. 3,949,657 to Sells, discussed in the background of the Fiterman '813 patent, and the improvement thereto disclosed in U.S. Pat. No. 4,843,953 to Sells. The Sells '657 roof ventilator is described as being fabricated from a section of honeycombed material coated with a moisture impervious substance, although the roof ventilator can be manufactured from a plurality of individual strips of corrugated plastic sheet material which are stacked and fastened together and then cut on the bias to produce the beveled inner and outer edge surfaces.

While one of the purposes of the narrow channels or tubular air passages of the roof ventilators identified above is to prevent snow or moisture from being blown upwardly from the exterior to the interior of the ventilator, as well as to prevent the ingress of insects, the tubular air passages can still allow precipitation drawn by capillary action or driven by high winds to reach the interior of the ventilator.

While flashing strips such as shown in the Sells '953 patent will assist in minimizing such problems, the angled flashing strip either requires separate assembly at the time of installation or prevents the incorporation of such a flashing strip in the manufacture of a foldable roof ventilator such as the Fiterman '813 patent discloses.

Another alternative is disclosed in U.S. Pat. No. 4,876,950 to Rudeen, which utilizes a single plastic membrane which flexes to conform to different roof pitches, and has a pair of open-celled foam plastic strips secured to the bottom surface thereof to act as the two vent parts placed on opposing sides of the open roof peak. The open celled foam consists of a latticework of interconnected filaments which permit ventilation, but which do not present a plurality of straight or unobstructed paths extending from the exterior to the interior of the roof ventilator.

While encompassing several distinctive features, the Rudeen '950 roof ventilator does lack the advantages of the Fiterman '813 roof ventilator in its unitary construction and ability to be folded. Where appropriate, however, the improvements disclosed herein apply equally to a roof ventilator construction of the type disclosed in the Rudeen '950 patent, as may be seen more fully from the detailed description of the invention set forth below.

One drawback of the foldable or flexible roof ventilators discussed above is that if the top surface of the top panel is to be angled parallel with the surface of the roof, the top panel must be scored or creased in order to form a center fold line across which the panel is folded or flexed to bring the top panel and opposing vent parts into parallel alignment and contact with the surface of the roof. Even with such a fold or crease, the top panel of the roof ventilator may not always fold along a straight line, but instead will buckle irregularly. Conversely, in some roofing applications (such as with the curved ceramic roofing tiles popular in the western United States) it is necessary to permit the top panel to be gradually convoluted rather than folded along a straight line, in order that the top panel will mold or conform to the non-uniform shape or arrangement of the roofing tiles.

Moreover, the top panel is generally solid throughout the central portion thereof to prevent moisture from leaking directly through the roof opening, and the top panel therefore does not permit or assist in ventilation between the interior and exterior of the roof ventilator.

Other screening or partitioning devices for blocking wind driven precipitation from entering the roof opening through the interior of a roof ventilator are known besides that shown in the Sells '953 patent. Representative examples are shown in U.S. Pat. Nos. 2,868,104 to Honholt; 3,311,047 to Smith; 3,481,263 to Belden; 3,625,134 to Smith; and 4,676,147 to Mankowski. The principle behind the operation of most of these devices is simply to place a perforated or slotted panel within the interior of the roof ventilator. The Mankowski '147 patent is interesting in that it places a generally open region between the exterior of the ventilator and the perforated panel, and a solid barrier of reduced height within that open area.

It must be noted that these examples all show roof ventilators constructed from generally heavier gauge materials such as sheet metal and require significantly greater fabrication time and more complex construction techniques than the foldable double-faced corrugated plastic or foam roof ventilators discussed above.

BRIEF SUMMARY OF THE INVENTION

It is therefore one object of this invention to design an improved roof ventilator which permits the top-most panel to be automatically folded along a relatively straight and uniform line when desired, but alternately conform to a non-uniform or irregularly aligned roofing surface when appropriate.

It is an additional object of this invention to design the above roof ventilator such that the top panel will assist in ventilation between the interior and exterior of the roof ventilator, so as to minimize the number of layered air passages and correspondingly the number of panels or strips required.

It is yet an another object of this invention to design the above roof ventilator such that it incorporates a barrier to prevent wind driven precipitation, as well as moisture drawn by capillary action, from accumulating in and blocking the tubular air passages, or passing through the interior of the roof ventilator and entering through the roof opening.

Briefly described, the ridge peak type roof ventilator of this invention comprises a pair of vent parts disposed on opposing sides of an opening in a roof peak, and a top panel disposed above and connecting each of the vent parts. The vent parts may be of unitary construction, folded from interconnected panels, or assembled from individual layers of sheet material. Each vent part forms a multiplicity of air passages through which air flows from the interior to the exterior of the roof ventilator. With a top panel constructed from double-faced corrugated plastic having a pair of planar plies and a convoluted intermediate ply, the underside of the top panel may be routed along the centerline to form a generally concave recessed area, thereby cutting away a section of one planar ply and part of the intermediate ply to form oval-shaped openings. Each opening has a pair of side walls traversing generally concave arcuate paths between a maximum height adjacent the side edges of the recessed area and a minimum height along the centerline. When selectively bent, the top panel will responsively fold along the centerline corresponding to the minimum heights of each of the side walls. Each vent part defines a columnar pocket which acts as a precipitation barrier, and which may be formed by cutting an array of vent apertures in separate panels and folding or attaching those panels in parallel abutting contact with the apertures aligned. All or some of the air may therefore be made to pass through the pockets The roof ventilator may be shipped flat or folded into a compact bundle.

BRIEF DESCRIPTION OF THE DRAWINGS

FIG. 3 is a perspective view of the roof ventilator of FIG. 1 partially unfolded;

FIG. 4 is a bottom plan view of the roof ventilator of FIG. 1 completely unfolded;

FIG. 5 is a partially broken away top plan view of the center of a first alternate embodiment of the roof ventilator of FIG. 1;

FIG. 6 is a partially broken away top plan view of the center of a second alternate embodiment of the roof ventilator of FIG. 1;

FIG. 7 is [an] *a* broken away perspective view of the roof ventilator of FIG. 1 in an inverted position;

FIG. 8 is a side elevation view of the roof ventilator of FIG. 1 taken from line 8—8 of FIG. 7 with the top panel of the roof ventilator flattened;

FIG. 9 is a side elevation view of the roof ventilator of FIG. 8 with the top panel of the roof ventilator partially folded or bent along the center;

FIG. 10 is a cross section view of the double-faced corrugated plastic sheet material used to fabricate the roof ventilator of FIG. 7 taken through line 10—10 of FIG. 7;

FIG. 11 is a bottom plan view of the routed center of the top panel of the roof ventilator of FIG. 1;

FIG. 12 is an enlarged view of the routed center of the top panel of the roof ventilator of FIG. 7 taken along the edge thereof;

FIG. 13 is an end elevation view of the "nick-scored" configuration of the roof ventilator of FIG. 1 taken from line 13—13 of FIG. 1 showing a pair of panels folded into parallel abutting contact;

DESCRIPTION OF THE PREFERRED EMBODIMENTS

The roof ventilator of this invention is shown in FIGS. 1–15 and referenced generally therein by the numeral 10.

The preferred embodiment of a foldable corrugated plastic roof ventilator is disclosed in U.S. Pat. No. 4,803,813 to Fiterman, the content of that patent disclosure and related documents being incorporated herein by reference. That embodiment has been generally characterized as a "slit-scored" configuration of the roofing ventilator which is cut, scored, and folded from a sheet of double-faced corrugated plastic sheet material. An alternate embodiment of the "slit-scored" roof ventilator, termed the "nick-scored" configuration, has been utilized herein for reference purposes.

It is further understood that the improvements disclosed and claimed herein, while preferably incorporated into the "nick-scored" or slit-scored" embodiments of the foldable double-faced corrugated plastic roof ventilator discussed, may be equally incorporated into an alternate embodiment of the roof ventilator constructed from individual strips or panels of corrugated plastic which are fastened together, as well as the types of roof ventilators disclosed in the Sells '657, Sells '953, or Rudeen '950 patents.

Figure 1:
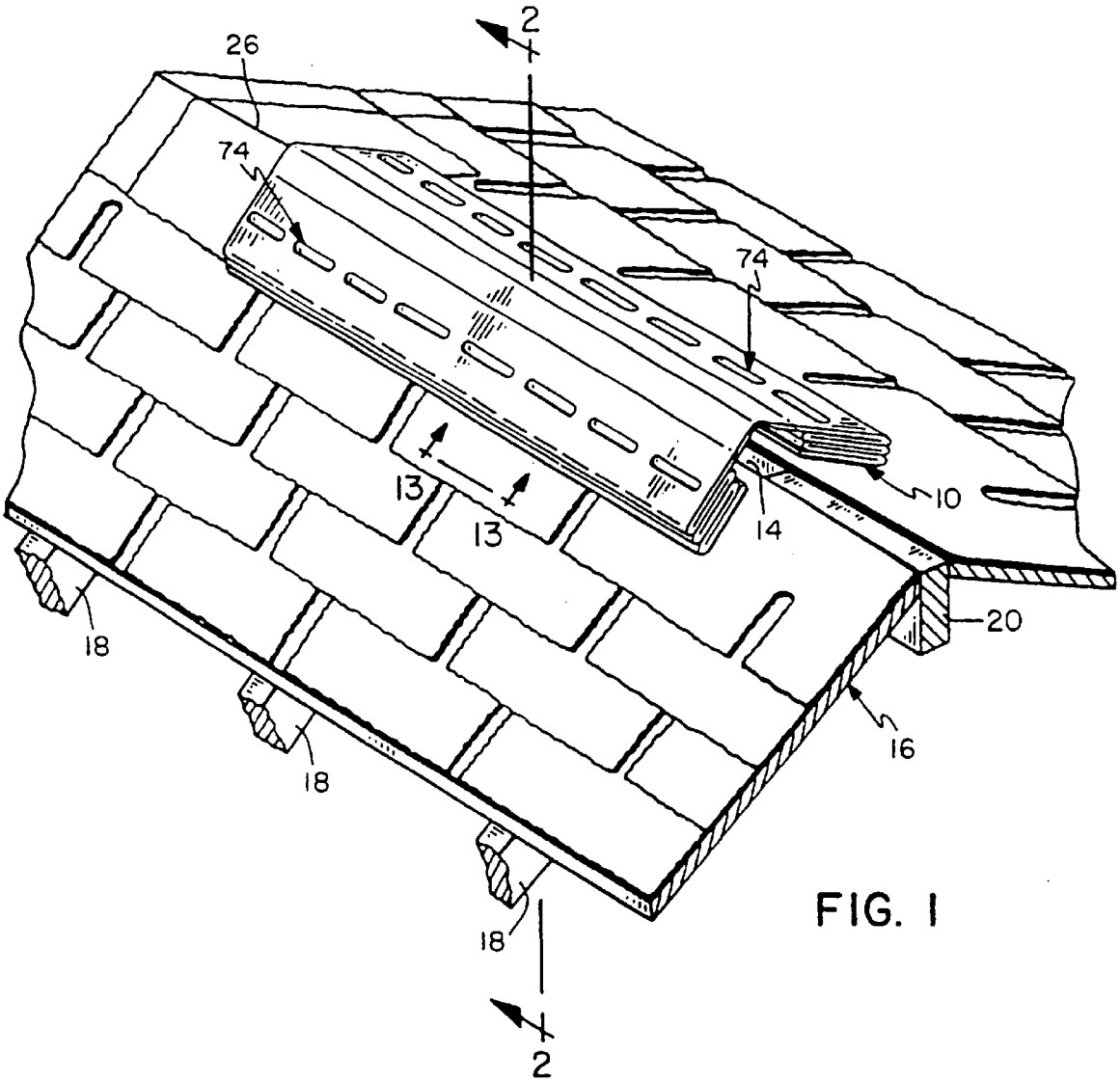
FIG. 1 is a perspective view of the roof ventilator of the invention installed on a roof.
Figure 2:
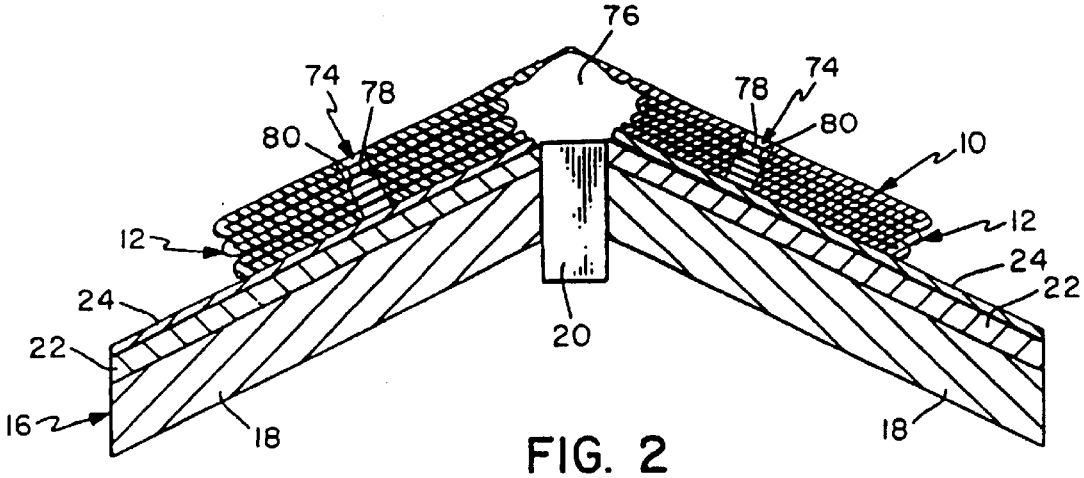
FIG. 2 is a front section view of the roof ventilator of FIG. 1 and the roof taken through line 2—2 of FIG. 1.

Referring particularly to FIGS. 1 and 2, it may be seen that the roof ventilator 10 comprises a pair of ventilator sections 12 disposed over an open cutout 14 in the roof 16. The roof 16 is generally comprised of a plurality of angled joists or trestles 18 which are fastened to a center beam 20. The joists 18 and beam 20 are covered with overlays of plywood 22 and shingles 24, respectively, and together form a central peak or ridge 26.

Referring to FIGS. 3 and 4, the ridge cap roof ventilator 10 is fabricated from a generally flat or planar section of double-faced corrugated plastic sheet material 28 such as polyethylene, preferably black in color. Referring to FIG. 10, it may be seen that the double-faced corrugated plastic sheet material 28 includes a pair of generally planar spaced-apart liners or plies 30, 32 which are connected by a corrugated or convoluted intermediate ply 34 having a multiplicity of convolutions forming parallel aligned air spaces 36 or partially enclosed channels defining a longitudinal grain G (*FIG. 3*) to the double-faced corrugated plastic sheet material 28. In some embodiments, the double-faced corrugated plastic sheet material 28 may take on the configuration of a pair of parallel planar plies 30, 32 with a multiplicity of generally perpendicular connecting beams (not shown), due to the particular molding process involved in making the double-faced corrugated plastic sheet material 28 and the tendency of the corrugated intermediate ply to melt together with the planar plies 30, 32.

Referring again to FIGS. 3 and 4, the flat section of double-faced corrugated plastic sheet material 28 is cut into a generally rectangular or square blank 38, preferably with a length of approximately 48" to 50" extending perpendicularly to the longitudinal grain G, and a width generally parallel with the longitudinal grain G of approximately 48" extending parallel with the longitudinal grain G, the overall dimensions of the blank 38 generally being limited only by the size of the corrugating machine forming the double-faced corrugated plastic sheet material 28. One of the pair of spaced-apart planar plies 30 thereby forms a top planar surface 40, with the opposing planar ply 32 forming a bottom planar surface 42.

The blank 38 is cut and scored to form a series of pleated or hingedly interconnected longitudinal panels including a pair of end panels 44, 46, four pairs of intermediate panels including a first pair 48, 50, second pair 52, 54, third pair 56, 58, and fourth pair 60, 62. In addition, either one single top panel 64 or a pair of center panels 65, 66 are disposed between the fourth pair of intermediate panels 60, 62, the top panel 64 or center panels 65, 66 extending across the top of the roof ventilator 10 when folded to its completely folded configuration as shown in FIG. 1.

Referring again to FIG. 4, it may be seen that the end and intermediate panels 44, 46, 48, 50, 52, 54, *56*, 58, 60, and 62 of the blank 38 are divided by lengthwise score lines 68 extending along or traversing the length of the blank 38 at a generally perpendicular angle relative to the grain G and the direction of extent of the channels 36. The score lines 68 may be of either the "slit-scored" configuration or "nick-scored" configuration. The "slit-scored" configuration, described more particularly in the Fiterman '813 patent referenced above, is characterized by only one of the planar plies 30, 32 being cut completely therethrough along the entire length of the blank 38. In contrast, the "nick-scored" configuration, shown more particularly in FIGS. 4 and 13, is characterized by both of the planar plies 30, 32 being cut completely therethrough in a plurality of aligned sections similar to enlarged perforations. The sections are separated by short segments 70 in which neither of the planar plies 32, 30 are cut, but are respectively either stretched across the thickness of two sheets or folded backward upon themselves as the adjoining end and intermediate panels 44, 46, 48, 50, 52, 54, *56*, 58, 60, and 62 are folded into parallel abutting contact with one another.

The widths of each of the end panels 44, 46, first pair 48, 50, second pair 52, 54, third pair 56, 58, and fourth pair 60, 62 of intermediate panels may form either a generally increasing progression from the outer edge panels 44, 46 inwardly toward the corresponding center panels 65, 66, or may have substantially equal widths to form uniform and non-tapered vent parts 12.

Referring to FIGS. 4–6, it may be seen that each of the end and intermediate panels 44, 46, 48, 50, 52, 54, *56*, 58, 60, and 62, as well as the top panel 64 or pair of center panels 65, 66, each define a plurality of oblong vent apertures 72 extending completely therethrough. The vent apertures 72 are spaced-apart and arrayed along straight lines in each of the corresponding panels 44, 46, 48, 50, 52, 54, *56*, 58, 60, 62, 65, and 66, and are arrayed so as to be aligned transversely across the width of the blank 38 from each panel to the adjacent or adjoining panels 44, 46, 48, 50, 52, 54, *56*, 58, 60, 62, 65, and 66 such that the vent apertures 72 are generally aligned vertically with and overlap at least a portion of one or more of the other vent apertures 72 when the blank 38 is folded to the completely folded roof ventilator configuration shown in FIGS. 1–3.

Referring particularly to FIG. 2, it may be seen that when aligned in a vertical column or stack, the vent apertures 72 form a plurality of generally columnar pockets 74 or recessed chambers extending at least partially through one or both of the vent parts 12 in a direction generally perpendicular to and disposed beneath the top panel 64 or a pair of center panels 65, 66. The pockets 74 are each disposed or positioned between the interior region 76 of the roof ventilator 10 and the exterior region surrounding the roof ventilator 10, and are each partially enclosed by the respective vent parts 12 along a first side 78 closest to the interior region 76 of the roof ventilator 10 and a second side 80 closest to the exterior region surrounding the roof ventilator 10. Each of pockets 74 interrupts a portion of the multiplicity of air passages 36, such that the sides 78, 80 of the pockets 74 adjoin and communicate with that portion of the multiplicity of air passages 36, and air passing from the exterior region surrounding the roof ventilator 10 to the interior region 76 through a portion of the multiplicity of air passages 36 must necessarily also traverse the pocket 74.

Figure 15:
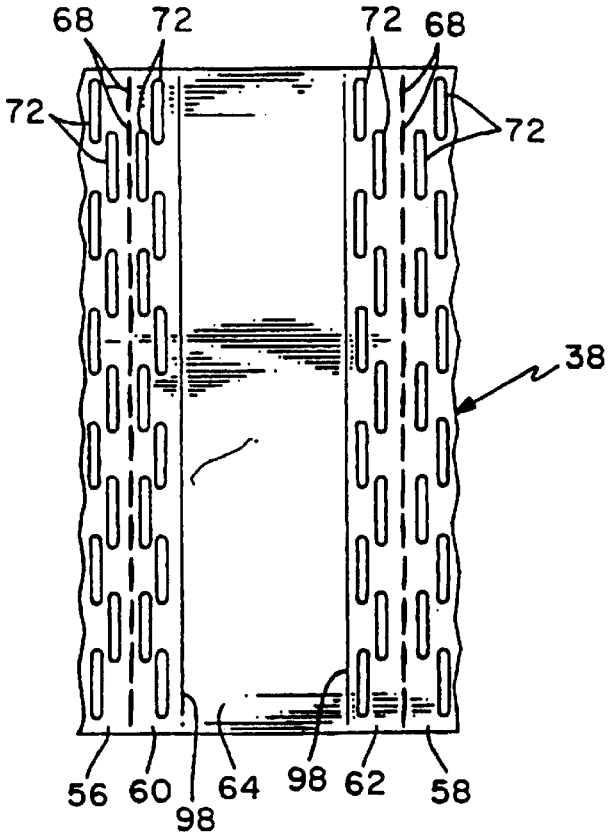
FIG. 15 is a partially broken away top plan view of the center of a third alternate embodiment of the roof ventilator of FIG. 1.

The pockets 74 may extend throughout the entire height of each of the vent parts 12, or may alternately extend throughout only a portion of the height of each vent part 12 and be disposed centered, closer to the top panel 66, or closer to the roof 16. In the event it is desired that all air passing from the exterior region surrounding the roof ventilator 10 to the interior region 76 through the multiplicity of air passages 36 pass through a pocket 74, it may be suitable to place two staggered lines of vent apertures 72 along each of the panels 44, 46, 48, 50, 52, 54, *56*, 58, 60, 62, 65, and 66 as shown in FIG. 15 such that each air passage 36 within a desired level or throughout the height of the vent parts 12 is interrupted by at least one, and in some cases two, of the columnar pockets 74 when the panels 44, 46, 48, 50, 52, 54, *56*, 58, 60, 62, 65, and 66 are completely folded to the roof ventilator configuration.

Referring to FIGS. 5 and 6, it may be seen that in some applications it is preferable for the single top panel 64 or pair of center panels 65, 66 to define one or more top openings or apertures 82 either alone or in addition to the vent apertures 72. The top apertures 82 may be disposed in two lines or sets disposed on opposing sides *of* a centerline crease 84 or fold line in the case of two center panels 65, 66 as shown in FIG. 5, or may alternately be placed in one line centered along a single top panel 64 as shown in FIG. 6.

Referring particularly to FIGS. 2 and 7–12, it may be seen that the top panel 64 has a concave recessed area 86 routed into the underside or bottom surface *42* of the top panel 64 facing or confronting the interior region 76 of the roof ventilator along the centerline thereof. The concave recessed area 86 cuts or extends entirely through the planar ply 32 and at varying depths partially or entirely through the convoluted intermediate ply 34.

As may be seen in FIGS. 1–3, this concave recessed area 86 exposes the air passages 36 of the top panel 64 to the interior region 76 so that the top panel 64 may also vent air to the exterior area surrounding the roof ventilator 10. Furthermore, due to the manner in which the convoluted intermediate ply 34 defining the longitudinal grain *G* and each of the air passages 36 is routed, each one of the convolutions defines a pair of side walls 88, 90 connected together and traversing a generally oval-shaped path and thereby defining a generally oval-shaped opening 92 in each air passage 36 when the blank 38 is inverted and viewed from above as in FIG. 11, and each defining a concave arcuate path when viewed from the side as in FIG. 8. Between the side walls 88, 90 is a generally open area exposed by the oval-shaped opening 92 and which is partially enclosed by the side walls 88, 90 and the planar ply 30. Because the bottom planar ply 32 is completely cut away, the concave recessed area 86 is therefore also generally bounded by two parallel straight side edges 94, 96 of the planar ply 32.

Referring to FIGS. 8 and 9, it may be seen that because the side walls 88, 90 each traverse the generally concave arcuate path, the top edges of each side wall 88, 90 adjacent to the straight side edges 94, 96 bounding the concave recessed area 86 are preferably disposed at the point where the planar ply 32 would meet the convoluted intermediate ply 34 as the double-faced corrugated plastic sheet material 28 is normally constructed, thereby providing the side walls 88, 90 with their maximum height at points most proximate to the straight side edges 94, 96 and disposed on opposing sides of the generally concave recessed area 86. Conversely, due to the generally concave arcuate path, the top edges of each side wall 88, 90 adjacent to the centerline C of the concave recessed area 86 are preferably disposed near to the point where the convoluted intermediate ply 34 would meet the planar ply 30, thereby providing the side walls 88, 90 with their minimum height at a point closely proximate to the centerline C of the generally concave recessed area 86. As the height of the side walls 88, 90 decreases, the resistance of the corrugated plastic sheet material 28 to bending against the grain of the convoluted intermediate ply 34 will diminish. Consequently, when the two sides of the top panel 64 are bent or flexed as shown in FIG. 9, the top panel 64 will automatically provide a straight and uniform bend or fold along a line defined by the lowest heights of each of the side walls 88, 90 for each of the air passages 36, which are preferably aligned along the centerline C of the generally concave recessed area 86.

Figure 14:
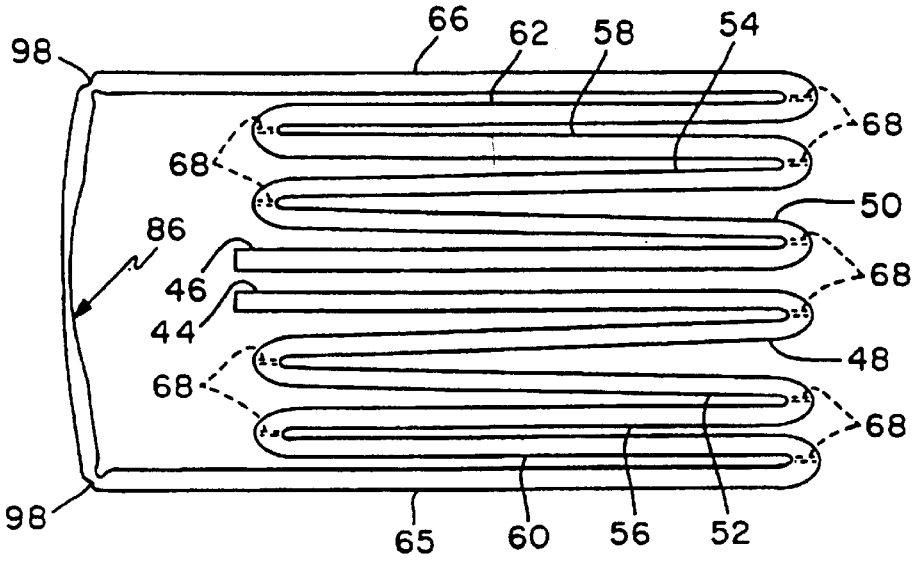
FIG. 14 is a side elevation view of the roof ventilator of FIG. 1 folded to the completely closed stored configuration.

Referring to FIGS. 3 and 14, it may be seen that the single top panel 64 may include two or more scored fold lines 98 which allow the top panel 64 to conform to a gentle curvature rather than strictly an angle when folded, and which permit the roof ventilator 10 to be completely folded into a compact bundle as shown in FIG. 14.

In operation, the roof ventilator 10 is folded from a flat blank 38 as shown in FIGS. 4–6 or 15 to a partially folded position as shown in FIG. 3, and to a completely folded operative configuration as shown in FIGS. 1 and 2. The top panel 64 of the roof ventilator 10 may be selectively bent or flexed, and will responsively fold along the centerline C and conform to the pitch of the roof 16. The roof ventilator 10 may then be attached to the roof 16 using nails or similar fasteners, and covered with shingles or tiles as desired. Air ventilated from within an attic beneath the roof 16 will pass upwardly through the opening 14 and into the interior region 76 of the roof ventilator 10. The air will then pass through the air passages 36, through the columnar pockets 74, and to the exterior surrounding the roof ventilator 10. Air may also pass through the oval-shaped openings 92 of the generally concave recessed area 86, and through the air passages 36 of the top panel 64. Precipitation driven through the air passages 36 from the exterior by strong winds, or drawn through the air passages 36 by capillary action, will be impeded or stopped by the barrier pockets 74.

While the preferred embodiment of the above ridge cap roof ventilator 10 has been described in detail above with reference to the attached drawing figures, it is understood that various changes and adaptations may be made in the roof ventilator 10 without departing from the spirit and scope of the appended claims.

What is claimed is:

1. In a roof ventilator for mounting on a peak of a roof having a roof opening, said roof ventilator having a pair of vent parts disposed on opposing sides of said roof opening and defining a multiplicity of air passages communicating with said roof opening, each said vent part including a plurality of vent panels which are interconnected and generally parallel to one another and disposed in a stack generally proximate to one another, said plurality of vent panels defining said multiplicity of air passages, the improvement comprising:

a first aperture defined by and extending completely through a first one of the plurality of vent panels and interrupting at least a portion of the multiplicity of air passages therein; and a second aperture defined by and extending completely through a second one of the plurality of vent panels and interrupting at least a portion of the multiplicity of air passages therein, such that said first aperture and said second aperture are generally aligned with and overlap at least a portion of one another.

2. The roof ventilator of claim 1 wherein the number of vent panels in each of the pair of vent parts is at least three, said roof ventilator further comprising:

a third aperture defined by and extending through a third one of the plurality of vent panels and interrupting at least a portion of the multiplicity of air passages therein, such that said third aperture is generally aligned with and overlaps at least a portion of the first aperture and the second aperture.

3. The roof ventilator of claim 2 wherein the number of vent panels in each of the pair of vent parts is at least four, said roof ventilator further comprising:

a fourth aperture defined by and extending through a fourth one of the plurality of vent panels and interrupting at least a portion of the multiplicity of air passages therein, such that said fourth aperture is generally aligned with and overlaps at least a portion of the first aperture, the second aperture, and the third aperture.

4. In a roof ventilator for mounting on a peak of a roof having a roof opening, said roof ventilator having a pair of vent parts disposed on opposing sides of said roof opening [and], each *of said vent parts* defining a multiplicity of air passages communicating with said roof opening, said pair of vent parts being connected to one another by a top panel, each of said pair of vent parts including at least a first vent panel and a second vent panel connected to said first vent panel such that said first vent panel is disposed above said second vent panel generally parallel thereto to form a stack, said first vent panel and said second vent panel defining said multiplicity of air passages, the improvement comprising:

at least one first aperture defined by and extending through the first vent panel and interrupting at least a portion of the multiplicity of air passages; and at least one second aperture defined by and extending through the second vent panel and interrupting at least a portion of the multiplicity of air passages, such that said first aperture and said second aperture are generally aligned with and overlap one another.

5. The roof ventilator of claim 4 wherein each of the pair of vent parts includes a third vent panel, said roof ventilator further comprising:

a third aperture defined by and extending through the third vent panel and interrupting at least a portion of the multiplicity of air passages, such that said third aperture is generally aligned with and overlaps at least a portion of the first aperture and the second aperture.

6. The roof ventilator of claim 5 wherein each of the pair of vent parts includes a fourth vent panel, said roof ventilator further comprising:

a fourth aperture defined by and extending through the fourth vent panel and interrupting at least a portion of the multiplicity of air passages, such that said fourth aperture is generally aligned with and overlaps at least a portion of the first aperture, the second aperture, and the third aperture.

7. In a roof ventilator for mounting on a peak of a roof having a roof opening, said roof ventilator having a pair of vent parts disposed on opposing sides of said roof opening and each defining a multiplicity of air passages communicating with said roof opening, said pair of vent parts being connected to one another by a top panel, each of said pair of vent parts including a plurality of vent panels which are interconnected and generally parallel to one another and disposed in a stack generally proximate to one another, said plurality of interconnected vent panels defining said multiplicity of air passages, the improvement comprising:

[a plurality of apertures, said plurality of apertures each being defined by and extending through the plurality of vent panels in a one of the pair of vent parts and interrupting at least a portion of the multiplicity of air passages therein, such that each of said plurality of apertures are generally aligned with and overlap one another within said one of the pair of vent parts] *each said vent part comprising a plurality of apertures, at least one of said apertures disposed in each of said vent panels, each said aperture defined by and extending through said vent panel and interrupting at least a portion of the multiplicity of air passages therein, such that said plurality of apertures are generally aligned with and overlap one another within each said vent part.*

8. In a roof ventilator for mounting on a peak of a roof having a roof opening, said roof ventilator having a pair of vent parts disposed on opposing sides of said roof opening and defining a multiplicity of air passages communicating with said roof opening, said pair of vent parts being connected to one another by a top panel disposed above said pair of vent parts, said roof ventilator defining an interior region and an exterior region surrounding said roof ventilator, the improvement comprising:

a pocket defined by and extending at least partially through at least a one of the vent parts in a direction generally perpendicular to the top panel and disposed beneath the top panel, said pocket being disposed between the interior region of the roof ventilator and the exterior region surrounding the roof ventilator and interrupting a portion of the multiplicity of air passages, said pocket being at least partially enclosed along a first side disposed closest to the interior region of the roof ventilator by said one of the vent parts and communicating therealong with said portion of the multiplicity of air passages, said pocket being at least partially enclosed along a second side disposed closest to the exterior region surrounding the roof ventilator by said one of the vent parts and communicating therealong with said portion of the multiplicity of air passages said pocket being spaced apart from the interior region by *a portion of* the vent part.

9. In a roof ventilator for mounting on a peak of a roof having a roof opening, said roof ventilator having a pair of vent parts disposed on opposing sides of said roof opening and a top panel disposed above said pair of vent parts, said top panel being constructed of a double-faced corrugated sheet material having a pair of planar plies spaced apart a distance and an intermediate ply, said intermediate ply having a multiplicity of convolutions and being disposed between and connected to each of said pair of planar plies to define a longitudinal grain and a multiplicity of partially enclosed air passages extending therethrough parallel with said longitudinal grain, said roof ventilator defining an interior region and an exterior region surrounding said roof ventilator, said top panel having an underside defined by a one of the pair of planar plies communicating with and proximate to said interior region, the improvement comprising:

a recessed area cut in and extending at least partially into the underside of the top panel, said recessed area extending through the one of the pair of planar plies defining the underside of the top panel and at least partially through the intermediate ply, said recessed area defining a plurality of openings, each of said *plurality of* openings communicating with a one of the multiplicity of air passages such that air may pass from the interior region of the roof ventilator through said plurality of openings defined by said recessed area into the multiplicity of air passages and to the exterior surrounding the roof ventilator, each of said plurality of openings having a pair of side walls defined by the intermediate ply, each of said pair of side walls traversing a generally oval-shaped path, such that the top panel may be manually folded across a path disposed within said recessed area.

10. The roof ventilator of claim 9 wherein each of the pair of side walls traverses a generally concave arcuate path.

11. The roof ventilator of claim 9 wherein the recessed area extends entirely through the one of the pair of planar plies defining the underside of the top panel, the one of the pair of planar plies thereby defining a pair of side edges bounding the recessed area, each of the pair of side walls having a maximum height measured adjacent to said side edges bounding the recessed area, and a minimum height measured at a point disposed between said pair of side edges bounding the recessed area.

12. The roof ventilator of claim 11 wherein each of the pair of said edges bounding the recessed area are generally straight.

13. The roof ventilator of claim 11 wherein the recessed area defines a centerline disposed approximately equidistant between the pair of side edges bounding the recessed area, and wherein the point at which the minimum height of each of the pair of side walls is measured is closely proximate to said centerline.

14. The roof ventilator of claim 13 wherein each of the pair of [said] *side* walls has a top edge, each said top edge being disposed proximate to the one of the pair of planar plies defining the underside of the top panel adjacent to each of the pair of side edges bounding the recessed area, and wherein each said top edge is disposed closely proximate to a remaining one of the pair of planar plies adjacent to the centerline.

15. The roof ventilator of claim 11 wherein the top panel may be selectively bent, the top panel folding generally along a line defined by and connecting each of the side walls of the recessed area at the point at which the minimum height of each of the side walls is measured responsive to the top panel being bent.

*16. In a roof ventilator for mounting on a peak of a roof having a roof opening, said roof ventilator having a pair of vent parts disposed on opposing sides of said roof opening and a top panel disposed above said pair of vent parts, said top panel being constructed of a double-faced corrugated sheet material having a pair of planar plies spaced apart a distance and an intermediate ply, said intermediate ply having a multiplicity of convolutions and being disposed between and connected to each of said pair of planar plies to define a longitudinal grain and a multiplicity of partially enclosed air passages extending therethrough parallel with said longitudinal grain, said roof ventilator defining an interior region and an exterior region surrounding said roof ventilator, said top panel having an underside defined by a one of the pair of planar plies communicating with and proximate to said interior region, the improvement comprising:*

*a generally concave recessed area cut in and extending at least partially into the underside of the top panel, said generally concave recessed area extending through the one of the pair of planar plies defining the underside of the top panel and at least partially through the intermediate ply, said generally concave recessed area having a pair of side edges and a centerline disposed*

*approximately equidistant between said pair of side edges, said generally concave recessed area defining a plurality of openings, each of said plurality of openings having a pair of side walls defined by the intermediate ply, said pair of side walls each traversing a generally oval-shaped path and having a side wall margin, said margin defining at least a portion of said generally concave recessed area such that the top panel may be manually folded within said generally concave recessed area.*

*17. The roof ventilator of claim 16 wherein the portion of said generally concave recessed area defined by the side wall margin is a generally smooth arcuate curve.*

*18. The roof ventilator of claim 16 wherein each of said plurality of walls defines a path and has a height, said height being generally greater at a first point and a second point than at a third point, each first, second, and third point disposed between said side edges, the third point disposed more closely proximate to the centerline that the first point and the second point, said path defined along said first point, said second point, and said third point.*

*19. The roof ventilator of claim 16 wherein each of said plurality of walls defines a path and has a height, said height being generally greater at a first point and a second point each disposed between said side edges than at a third point, the third point being disposed between the first point and the second point.*

*20. The roof ventilator of claim 16 wherein each of said plurality of walls defines a path and has a height, said height being generally greater at a first point and a second point than at a third point, each of the first point and the second point being disposed more closely proximate to a corresponding one of the pair of side edges than the third point.*

* * * * *

UNITED STATES PATENT AND TRADEMARK OFFICE

CERTIFICATE OF CORRECTION

PATENT NO. : RE 37,388 E
DATED : September 25, 2001
INVENTOR(S) : Kasner

It is certified that error appears in the above-identified patent and that said Letters Patent is hereby corrected as shown below:

Column 1,
Line 12, after "ventilator" please insert -- . --.

Column 2,
Line 53, please delete the word "an".

Column 3,
Line 17, after the word "pockets" please insert -- . --.
Line 22, after "ventilator of" please delete the word "the" and insert in its place -- this --.

Column 4,
Line 14, before the word "slit-scored" please insert -- " --.

Signed and Sealed this

Twentieth Day of August, 2002

*Attest:*

*Attesting Officer*

JAMES E. ROGAN
*Director of the United States Patent and Trademark Office*

UNITED STATES PATENT AND TRADEMARK OFFICE

CERTIFICATE OF CORRECTION

PATENT NO. : RE 37,388 E
DATED : September 25, 2001
INVENTOR(S) : Kasner et al.

It is certified that error appears in the above-identified patent and that said Letters Patent is hereby corrected as shown below:

Column 1,
Line 7, insert -- More than one reissue application has been filed for this reissue of U.S. Patent No. 5,094,041. The reissue applications are U.S. Patent Application No. 08/209,559 (the present application) and U.S. Patent Application No. 09/862,905, which is a continuation reissue application of the present application. --.

Signed and Sealed this

Fifteenth Day of July, 2003

JAMES E. ROGAN
*Director of the United States Patent and Trademark Office*